(12) United States Patent
Owen et al.

(10) Patent No.: US 8,723,966 B2
(45) Date of Patent: May 13, 2014

(54) VIDEO STABILIZATION

(75) Inventors: Christopher Owen, Järfälla (SE); Pontus Carlsson, Bromma (SE)

(73) Assignee: Skype, Dublin (IE)

( * ) Notice: Subject to any disclaimer, the term of this patent is extended or adjusted under 35 U.S.C. 154(b) by 0 days.

(21) Appl. No.: 13/307,800

(22) Filed: Nov. 30, 2011

(65) Prior Publication Data

US 2013/0076921 A1    Mar. 28, 2013

(30) Foreign Application Priority Data

Sep. 26, 2011    (GB) .................................. 1116566.9

(51) Int. Cl.
*H04N 5/228*    (2006.01)

(52) U.S. Cl.
USPC ....................................................... 348/208.4

(58) Field of Classification Search
USPC ....................................................... 348/208.4
See application file for complete search history.

(56) References Cited

U.S. PATENT DOCUMENTS

| | | | |
|---|---|---|---|
| 4,864,409 A | 9/1989 | Platte et al. | |
| 4,959,725 A | 9/1990 | Mandle | |
| 6,982,746 B1 | 1/2006 | Kawahara | |
| 8,358,345 B1 | 1/2013 | Fiore et al. | |
| 2005/0179784 A1 | 8/2005 | Qi | |
| 2006/0140603 A1 | 6/2006 | Kurata et al. | |
| 2006/0210175 A1 | 9/2006 | Huang et al. | |
| 2007/0122129 A1 | 5/2007 | Sakamoto et al. | |
| 2008/0004073 A1 | 1/2008 | John et al. | |
| 2008/0012945 A1 | 1/2008 | Uenaka | |
| 2008/0136931 A1 | 6/2008 | Hatanaka et al. | |
| 2009/0309984 A1 | 12/2009 | Bourgain et al. | |
| 2010/0060751 A1 | 3/2010 | Pinto et al. | |
| 2010/0295961 A1 | 11/2010 | Terauchi | |
| 2010/0328472 A1 | 12/2010 | Steinberg et al. | |
| 2011/0007175 A1 | 1/2011 | Fujita et al. | |
| 2011/0228112 A1 | 9/2011 | Kaheel et al. | |
| 2012/0069203 A1 | 3/2012 | Voss et al. | |
| 2012/0162449 A1 | 6/2012 | Braun et al. | |
| 2012/0307086 A1 | 12/2012 | Jefremov et al. | |
| 2013/0093906 A1 | 4/2013 | Carlsson | |

FOREIGN PATENT DOCUMENTS

| | | |
|---|---|---|
| EP | 0520741 | 12/1992 |
| EP | 1377040 A1 | 1/2004 |
| EP | 1679884 A1 | 7/2006 |
| EP | 2219364 | 8/2010 |
| JP | 11098420 | 4/1999 |
| JP | 2003234946 | 8/2003 |
| WO | WO-2010116366 | 10/2010 |

OTHER PUBLICATIONS

"Partial International Search Report", Application No. PCT/EP2012/060315, (Aug. 28, 2012), 5 pages.

(Continued)

*Primary Examiner* — Kelly L Jerabek
*Assistant Examiner* — Stephen Coleman
(74) *Attorney, Agent, or Firm* — Sonia Cooper; Jim Ross; Micky Minhas

(57) ABSTRACT

Method, device and computer program product for transmitting a video signal from a user device includes capturing a plurality of frames of the video signal using a camera at the user device, determining a functional state of the device and selectively stabilizing the video signal prior to transmission based on the functional state.

15 Claims, 4 Drawing Sheets

(56) References Cited

OTHER PUBLICATIONS

Chen, Xiaoming et al., "SaVE: Sensor-assisted Motion Estimation for Efficient H.264/AVC Video Encoding", MM '09, (Oct. 19-24, 2009), Beijing, China, (Oct. 19, 2009), 10 pages.

Drahansky, Martin et al., "Accelerometer Based Digital Video Stabilization for General Security Surveillance Systems", *International Journal of Security and its Applications*, vol. 1, No. 1, 1-10, (Jan. 2010), 10 pages.

Hong, Guangming et al., "SenseCoding: Accelerometer-Assisted Motion Estimation for Efficient Video Encoding", *Proceedings of the 2008 ACM International Conference on Multimedia with Co-Located Symposium & Workshops: Area 03 08, Communicabilityms '08, HCC '08, MIR '08, MS'08, SAME '08, SRMC '08, TVS '08, VNBA '08*: Vancouver, BC, Canada, Oct. 27-31, 2008, XP0079186, (Oct. 26, 2008), pp. 749-752.

Karpenko, Alexandre et al., "Digital Video Stabilization and Rolling Shutter Correction using Gyroscopes", *Stanford Tech Report CTSR 2011-03*, (Mar. 2011), 7 pages.

Lin, Andy L., "Using Sensors for Efficient Video Coding in Hand-Held Devices", *Stanford University*, (Nov. 12, 2010), 5 page.

Yang, Junlan et al., "Online Video Stabilization Based on Particle Filters", *Image Processing, 2006 IEEE International Conference* (Oct. 8-11, 2006), (Oct. 8, 2006), 4 pages.

"International Search Report", Mailed Date: Jan. 25, 2013, Application No. PCT/US2012/057402, Filed Date: Sep. 26, 2012, pp. 15.

"International Search Report and Written Opinion", Application No. PCT/EP2012/060315, (Jan. 17, 2013), 19 pages.

"Search Report", GB Application No. 1109071.9, (Nov. 5, 2012), 4 pages.

"Non-Final Office Action", U.S. Appl. No. 13/296,941, (Jun. 6, 2013), 15 pages.

"Restriction Requirement", U.S. Appl. No. 13/296,941, (Apr. 25, 2013), 6 pages.

"Notice of Allowance", U.S. Appl. No. 13/296,941, Dec. 10, 2013, 21 pages.

Front-facing side    Rear-facing side

Interior

VIDEO STABILIZATION

RELATED APPLICATION

This application claims priority under 35 U.S.C. §119 or 365 to Great Britain Application No. GB1116566.9, filed Sep. 26, 2011.

The entire teachings of the above application are incorporated herein by reference.

TECHNICAL FIELD

The present invention relates to stabilization of a video signal. In particular, the present invention relates to capturing frames of a video signal using a camera and compensating for motion of the camera to thereby stabilize the video signal.

BACKGROUND

Cameras can be used to capture a sequence of images to be used as frames of a video signal. Cameras may be fixed to stable objects, for example a camera may be mounted on a stand such as a tripod to thereby keep the camera still while the video frames are captured. However, often cameras may be implemented in mobile devices and are not necessarily mounted to fixed objects, for example a camera may be held, or may be on a moving object such as a vehicle. Movement of the camera while the camera is capturing frames of a video signal may result in unwanted movement in the video signal itself.

Image stabilization is a method that can be used to compensate for the unwanted movement in a video signal. Some systems perform motion estimation in order generate motion vectors for use by an image stabilization process. One such system is described in "Online Video Stabilization Based on Particle Filters" by Junlan Yang et. al. Image stabilization algorithms may consist of three main parts: motion estimation, motion smoothing and motion compensation. A motion estimation block may estimate local motion vectors within the video signal and on the basis of these local estimates calculate a global motion vector. A motion smoothing block may then deal with filtering of the estimated global motion vector in order to smooth the calculated value and prevent large and undesirable differences between motion vectors calculated previously. A motion compensation block may then shift an image in the opposite direction to the filtered global motion vector to thereby stabilize the video signal. The motion compensation block may take into account sophisticated transformations like rotation, warping or zooming.

It can require large amounts of processing resources to perform image stabilization based on motion vectors as described above. This can be a problem when the video signal is to be stabilized in real time, i.e. when a stabilized version of the video signal is to be used (e.g. transmitted in a video call or output from a device) at the same time as it is being captured by the camera. This can also be a problem when the device which is performing the image stabilization is a small, mobile device such as a mobile telephone in which the processing resources are limited.

In recent years, motion sensors have become simpler and cheaper to manufacture and the size of motion sensors has reduced significantly. It is now feasible to implement motion sensors in mobile devices. Motion sensors generate samples representing the motion of the sensor. Two prior art documents: "Using Sensors for Efficient Video Coding in Handheld devices" by Andy L. Lin and "Accelerometer Based Digital Video Stabilization for General Security Surveillance Systems" by Martin Drahanský et. al, mention the possibility of using data from motion sensors for stabilization of a video signal.

A known processing utility "VirtualDub" provides offline stabilization (i.e. not in real time) that requires cropping of the video signal.

One mechanism for online (i.e. real time) send side digital stabilization has been proposed in GB Application No. 1109071.9. This mechanism is effective in many situations but requires cropping of the transmitted video. This can affect the quality of the transmitted video.

SUMMARY

According to one aspect of the invention there is provided a method of transmitting a video signal from a user device, the method comprising: capturing a plurality of frames of the video signal using a camera at the user device; determining a functional state of the device; and selectively stabilizing the video signal prior to transmission based on the functional state.

Preferably, the functional state is a degree of motion of the camera, the method comprising: monitoring the motion of the camera and comparing it with a threshold.

The monitoring may comprise: using a motion sensor associated with the camera to generate a plurality of samples representing motion of the camera; using the samples to determine a displacement of the camera between successive frames captured by the camera; and determining a pixel displacement representing motion in the video signal between the successive frames caused by the determined displacement of the camera, the method further comprising; and the method may further comprise comparing the pixel displacement to the threshold; stabilizing the video signal prior to transmission if the pixel displacement exceeds said threshold; and transmitting the video signal without stabilization otherwise.

Preferably, the motion of the camera is rotational motion, the motion sensor is a rotational motion sensor and the displacement of the camera is an angular displacement of the camera.

The user device comprises a front facing camera and a rear facing camera and when the functional state is a selection of the front facing camera, the video signal may be transmitted without stabilization. Preferably, the video signal may be stabilized when the rear facing camera of the device is selected.

Preferably, the sample rate of the samples generated using the motion sensor is higher than the frame rate of the video signal.

The camera and the motion sensor may be situated within a mobile device.

The step of stabilizing the video signal may comprise: filtering the pixel displacement; and shifting the image of at least one of the first and second frames in accordance with the filtered pixel displacement.

The step of filtering the pixel displacement may comprise: determining an accumulated pixel displacement based on said determined pixel displacement for the second frame; and determining a filtered accumulated pixel displacement for the second frame based on a weighted sum of the determined accumulated pixel displacement for the second frame and a filtered accumulated pixel displacement for the first frame.

Preferably, a time offset is added to at least one of (i) the captured plurality of frames, and (ii) the generated plurality of samples, such that the timing of the captured plurality of frames matches the timing of the generated plurality of samples.

If the pixel displacement exceeds the threshold, a timer may be used to determine whether a predetermined period of time has elapsed and the video signal is only stabilized when the time period has elapsed. The timer may be reset if the pixel displacement does not exceed said threshold, According to a second aspect of the invention there is provided a device for stabilizing a video signal, the device comprising: a camera configured to capture a plurality of frames of the video signal; means for determining a functional state of the device; and means for selectively stabilizing the video signal prior to transmission based on the functional state.

Preferably, the functional state is a degree of motion of the camera, the device comprising: means for monitoring the motion of the camera and comparing it with a threshold.

The device may further comprise: a motion sensor, associated with the camera, configured to generate a plurality of samples representing motion of the camera; a pixel displacement determining block configured to use the samples to determine a pixel displacement of the camera between successive frames captured by the camera, said pixel displacement representing motion in the video signal between the successive frames caused by motion of the camera; a comparison block configured to compare the pixel displacement to a predetermined threshold; and a motion compensation block configured to stabilize the video signal prior to transmission if the pixel displacement exceeds said threshold, otherwise no stabilization is implemented prior to transmission.

Preferably, the motion of the camera is rotational motion, the motion sensor is a rotational motion sensor and the displacement of the camera is an angular displacement of the camera.

The motion sensor may be gyroscopic motion sensor. The device may be a mobile device.

According to a third aspect of the invention there is provided a computer program product for stabilizing a video signal, the computer program product being embodied on a non-transient computer-readable medium and configured so as when executed on a processor of a device to perform the operations of any of claims 1 to 13.

The inventors have realized that in order to maximize output video resolution, it is desirable to only implement video stabilization when required to avoid unnecessary cropping of the transmitted video signal.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

For a better understanding of the present invention and to show how the same may be put into effect, reference will now be made, by way of example, to the following drawings in which.

DETAILED DESCRIPTION

The teachings of all patents, published applications and references cited herein are incorporated by reference in their entirety.

Preferred embodiments of the invention will now be described by way of example only.

Figure 1A:
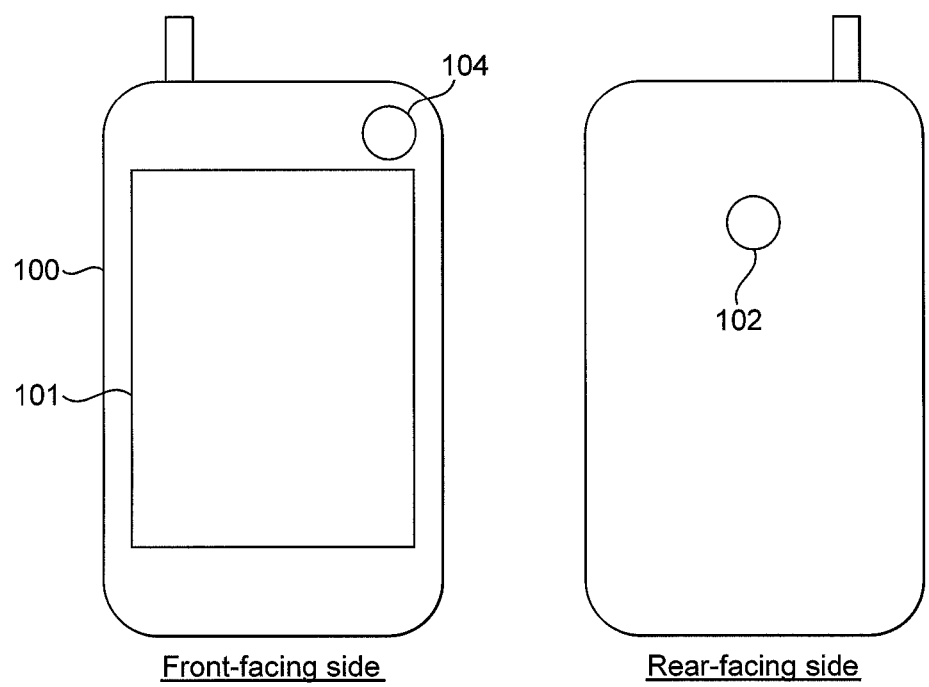
FIGS. 1a and 1b show a device according to a preferred embodiment.
Figure 1B:
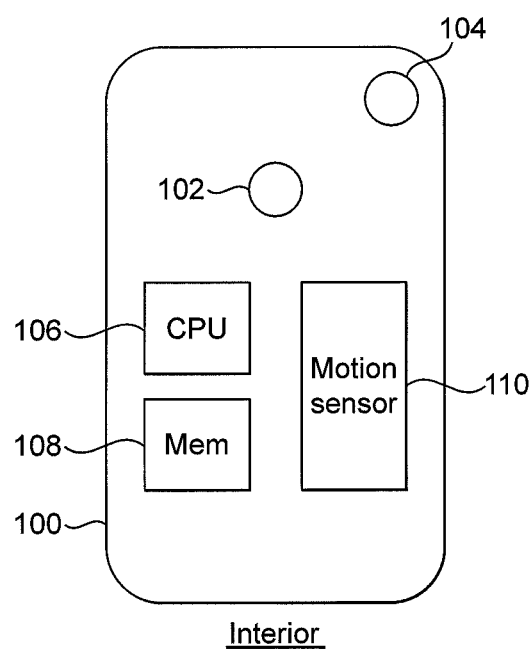

FIGS. 1a and 1b show a device 100 according to a preferred embodiment. The device 100 may for example be a mobile device such as a mobile telephone or other hand-held device. The device 100 comprises a front-facing camera 104 facing in the same direction as a screen 101 and a rear-facing camera 102 facing in the opposite direction to the screen 101. The device 100 further comprises a motion sensor 110, a CPU 106 and a memory 108. Both the front-facing camera 104 and the rear-facing camera 102 are each configured to capture images when selected by a user. The captured images may be used to form a video signal, whereby each image is used as a frame of the video signal and the images are captured at the frame rate of the video signal. The frame rate may be, for example, 25 frames per second although the camera may operate at a different frame rate. The minimum frame rate to achieve the perception of a moving image is about fifteen frames per second, but this may depend upon the person viewing the video signal and upon the content that is in the video signal (i.e. how much motion there is in the subject matter of the video signal). The motion sensor 110 is configured to generate samples representing the motion of the device 100. Since both the motion sensor 110 and the cameras 104,102 are in the device 100, they are associated with each other such that the samples generated by the motion sensor 104 can be used to represent the motion of either camera 104,102. The CPU 106 is configured to perform computational processes on the device 100 as is known in the art. The memory 108 is used to store data in the device 100 as is known in the art. The blocks 102, 104, 106 and 108 can communicate with each other by sending data via a bus of the device 100 (not shown in FIG. 1) as is known in the art.

A stabilizer is described herein which can be in three states. The stabilizer may be implemented as code executed on the CPU 106.

The state of the stabilizer is selected based on the functional state of the mobile device. The first state is where the stabilizer is off and the process of stabilizing a video signal described below is not implemented. When the front-facing camera 104 captures a video signal, the stabilizer is in the first state. Stabilization is disabled on front-facing camera 104 because cropping narrows the viewing angle and stabilizer stabilizes the background potentially adding more motion to the video signal.

The second state of the stabilizer is where high frequency motion (shakiness) of the device is monitored however no cropping of the video signal is implemented. When the rear-facing camera 102 captures a video signal, the stabilizer is in the second state.

The third state of the stabilizer is where stabilization is applied whereby a video signal captured by the rear-facing camera 102 is cropped.

Figure 2:
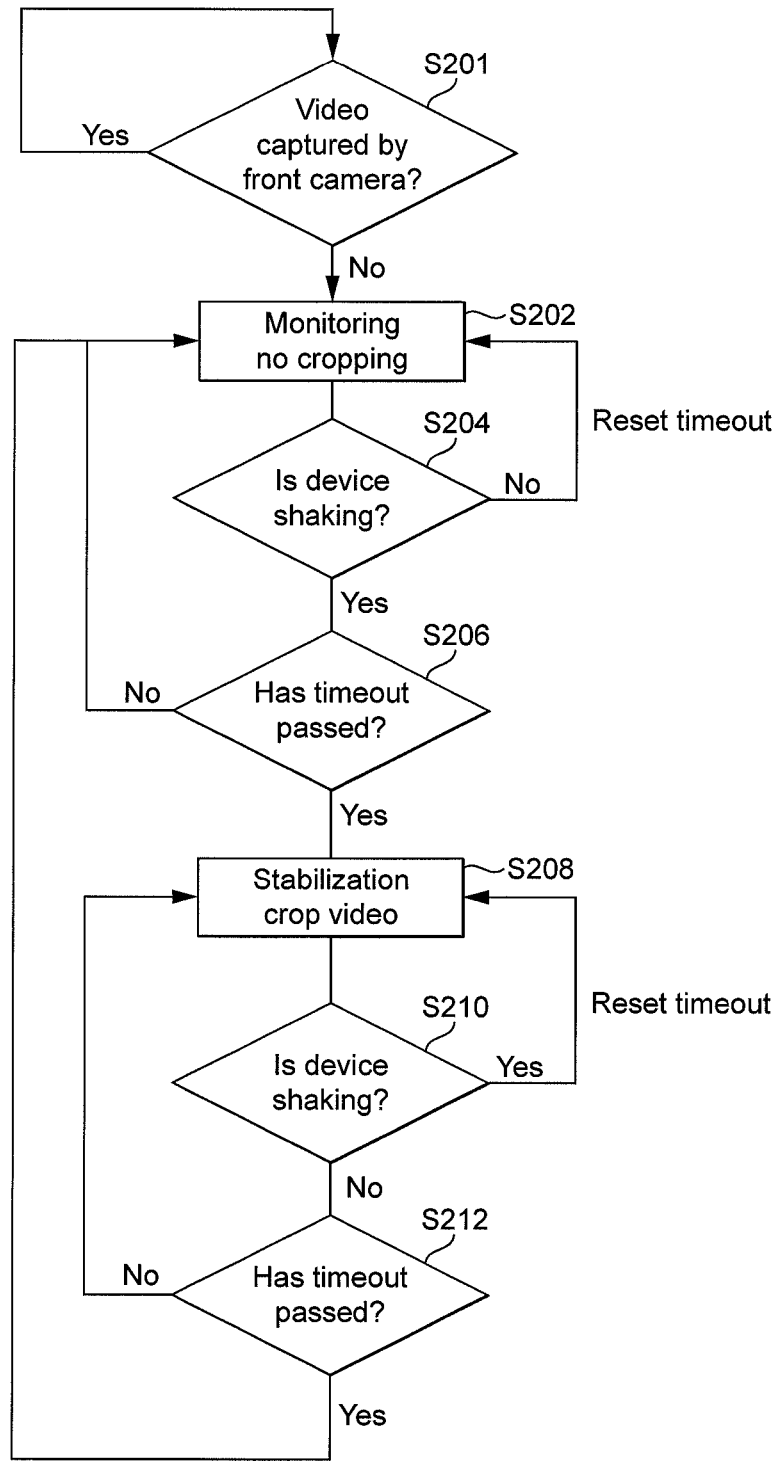
FIG. 2 is a flow chart for a process of stabilizing a video signal according to a preferred embodiment.

FIG. 2 illustrates a process of stabilizing a video signal using the device 100 according to a preferred embodiment.

In step S201, the process determines whether the video signal is captured by the front-facing camera 104. That is, a determination is made as to whether the stabilizer is in the first state. If the video signal is captured by the front-facing camera 104 then the process does not proceed. If the video signal is not captured by the front-facing camera 104 (i.e. the video signal is captured the rear-facing camera 102) then the process proceeds to step S202.

In step S202 the shakiness of the rear-facing camera 102 is monitored.

Figure 3:
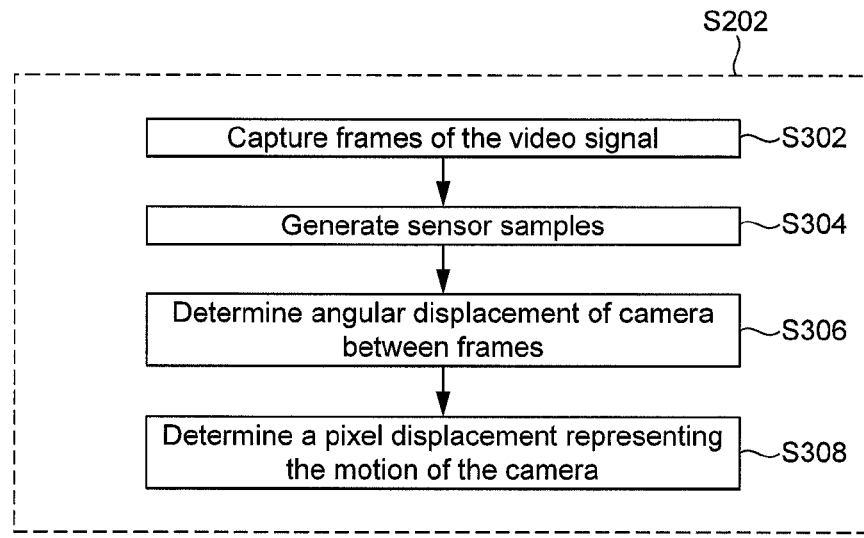
FIG. 3 is a flow chart for a monitoring process according to a preferred embodiment.

The monitoring step S202 is shown in more detail in FIG. 3. A step S302 the rear-facing camera 102 captures images to be used as frames of a video signal. For example, the camera 102 may have an array of light sensors which record the level of light that is incident on the sensors during the time allocated to a frame of the video signal. A shutter of the camera 102 is used to separate the frames in time, such that during each frame the shutter is open for a period of time and closed for another period of time. The captured frames of video signal are provided to a pre-processor (e.g. implemented in a processing block by the CPU 106). The pre-processor operates to stabilize the images in the frames of the video signal before the frames are encoded using a video encoding technique as is, known in the art.

In step S304, while the camera 102 is capturing frames of the video signal, the motion sensor 110 generates samples representing the motion of the device 100. For example, the motion sensor 110 may be a rotational motion sensor such as a gyroscope. The gyroscope 110 measures angular velocity of the device 100 and outputs samples representing the angular velocity at particular intervals. The intervals may, or may not, be regular intervals. Preferably, but not necessarily, on average the sample rate of the samples output from the gyroscope 110 is higher than the frame rate of the video signal. For example, the sample rate output from the gyroscope 110 may be 60 samples per second, which reflects the maximum usual shaking frequency of the device 100 and is currently independent of frame rate. The samples generated by the gyroscope 110 are provided to the pre-processor.

In step S306 the angular displacement of the camera 102 between two frames (frame 1 and frame 2) of the video signal is determined. This determination may be performed by a processing block of the CPU 106. The inventors have identified that in order to effectively determine the angular displacement between the two frames using data from the gyroscope 110, it is useful to integrate the angular velocity over the time interval between the midpoints of the exposure times of the frames captured by the camera 102. The inventors have also determined that this can be particularly problematic as it may not be possible to synchronies the sampling rate of the gyroscope 110 with the frame rate of the camera 102, particularly when:

the camera 102 is arranged to adjust the exposure times in dependence on the available light (which many cameras are);

the time stamps for the frames of the video signal provided by the camera 102 relate to the times at which the shutter closes (i.e. the end times of the frames, as opposed to the midpoints of the exposure times of the frames); and the gyroscope data is not available at the midpoint of the exposure time of the frames.

As described above, the pre-processor receives video frames from the camera 105 and also receives the samples from the gyroscope 110. The samples from the gyroscope 110 are provided to the pre-processor (e.g. at regular intervals), at a rate at least equivalent to the frame rate of the video signal captured by the camera 105. Using a higher sampling rate in the gyroscope 110 gives more accurate angle estimates but can be more costly in terms of CPU usage.

A time stamp, $t_1$, provided by the camera 102 to a first frame (frame 1) of the video signal indicates the end time of the frame, i.e. the time at which the shutter of the camera 102 is closed to end frame 1. Similarly, a time stamp, $t_2$, provided by the camera 102 to a second frame (frame 2) of the video signal indicates the end time of the frame, i.e. the time at which the shutter of the camera 102 is closed to end frame 2. In order to determine the angular displacement ($\Delta\theta$) of the device 100 between the first frame and the second frame, rather than using the time stamps of the frames to denote the times of the frames, it is more accurate to use the midpoints of the exposure time of frame 1 and frame 2. The exposure times of the first and second frames are denoted by $e_1$ and $e_2$. The angular displacement is determined by integrating the angular velocity (represented by the samples output from the gyroscope 110) of the device 100 between a time $t_1 - 0.5e_1$ and a time $t_2 - 0.5e_2$. Therefore the angular displacement between frame 1 and frame 2 is given by:

$$\Delta\theta = \theta(t_2) - \theta(t_1) = \int_{t_1 - 0.5e_1}^{t_2 - 0.5e_2} \omega(t) dt$$

Figure 4:
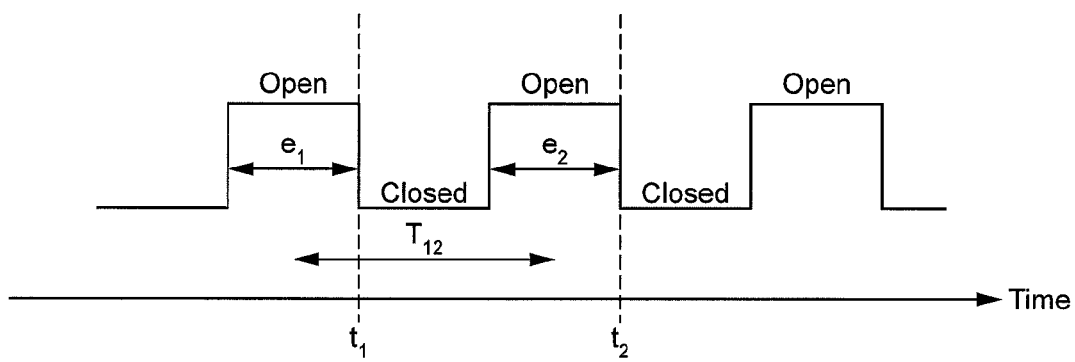
FIG. 4 is an exemplary graphical representation of a shutter position of a camera over time.

FIG. 4 is an exemplary graphical representation of a shutter position of the camera 105 over time. The shutter of the camera 102 closes at time $t_1$ at the end of frame 1. The shutter re-opens again for the camera 102 to capture frame 2 and then closes at time $t_2$ at the end of frame 2. The exposure time of frame 1 is shown as $e_1$ and the exposure time of frame 2 is shown as $e_2$ in FIG. 4. The time over which the angular velocity is integrated is denoted $T_{12}$ in FIG. 4. It can be appreciated from looking at FIG. 4 that integrating over the time $T_{12}$ corresponds to integrating between the midpoint of the exposure time of the first frame (at time $t_1 - 0.5e_1$) and the midpoint of the exposure time of the second frame (at time $t_2 - 0.5e_2$). FIG. 4 shows the open time of the shutter to be equal to the closed time of the shutter, but this is just one example. In some embodiments (implementing short exposure times) the time for which the shutter is open is shorter than the time for which the shutter is closed. In contrast, in other embodiments (implementing long exposure times) the time for which the shutter is open is longer than the time for which the shutter is closed.

Since the samples of the gyroscope 110 are not synchronized with the timings of the frames of the video signal captured by the camera 102, it might be the case that the gyroscope 110 does not generate samples at the midpoints of the frames (frame 1 and frame 2). In which case, the angular velocity of the device 100 at the midpoints of the frames can be determined by interpolating the angular velocity represented by the samples generated by the gyroscope 110. The angular velocity is evaluated by interpolation at any time instant, and the midpoints of the exposure times of the frames define the integral interval used when calculating the angular displacement according to the equation above.

Figure 5:
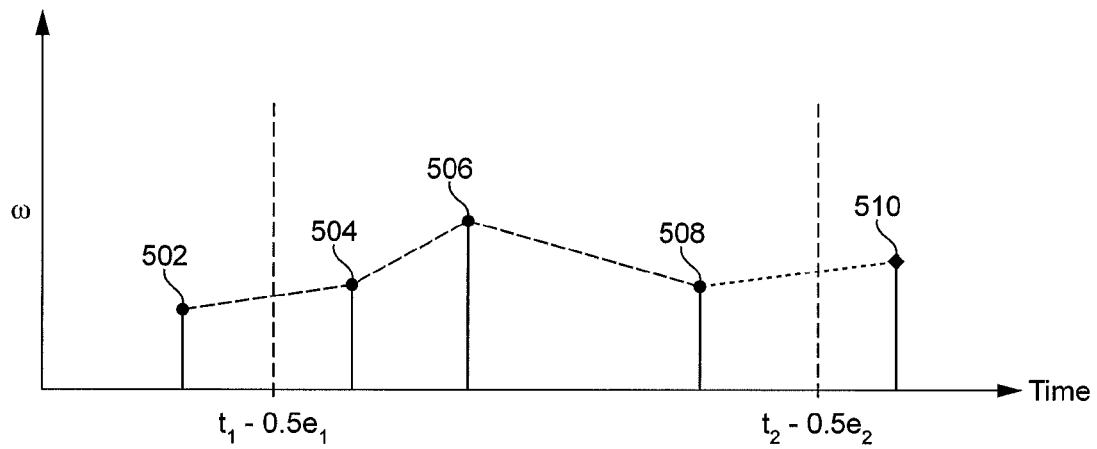
FIG. 5 is an exemplary graphical representation of an angular velocity of a camera over time.

FIG. 5 is an exemplary graphical representation of an angular velocity of the camera 102 over time. The samples representing the angular velocity of the device 100 generated by the gyroscope 110 are shown in FIG. 5 as samples 502, 504, 506, 508 and 510. It can be seen that in the example shown in FIG. 5 the timings of the samples of the gyroscope 110 are not regular. For example, the time between the samples 504 and 506 is shorter than the time between the samples 506 and 508. The dotted line connecting the samples in FIG. 5 shows the value of the angular velocity that can be determined as a function of time by interpolating the angular velocity represented by the samples generated by the gyroscope 110. The interpolated angular velocity (shown by the dotted line) can be integrated between times $(t_1-0.5e_1)$ and $(t_2-0.5e_2)$ in order to determine the angular displacement of the camera 102 between the first and second frames. FIG. 5 shows a simple linear interpolation between the samples from the gyroscope 110. In other embodiment, more advanced interpolation could be used.

There may arise a situation in which a frame to be stabilized is received at the pre-processor after the latest sample from the gyroscope 110. For example, when the frame 2 is captured at the camera 102 the frame 2 may be received at the pre-processor before any samples from the gyroscope have been generated subsequent to the midpoint of the exposure time of the frame 2 $(t_2-0.5e_2)$. For example frame 2 may be received at the pre-processor before the sample 510 shown in FIG. 5. In this situation, delay may be introduced into the video stream, in order for the sample 510 to be received at the pre-processor before the frame 2 is processed, thereby allowing the angular velocity at time $(t_2-0.5e_2)$ to be determined before the frame 2 is processed by the pre-processor. Alternatively, the angular velocity may be extrapolated from the previously received samples from the gyroscope 110 in order to determine the angular velocity of the device 100 at the time $(t_2-0.5e_2)$.

In the case of no motion of the camera 102 (e.g. for fixed placement of the device 100), the gyroscope 110 may be disabled in order to save battery life. The state of no motion can be determined by feedback from a video encoder which encodes the video signal subsequent to the image stabilization method described herein and implemented by the pre-processor. The video encoder may perform motion estimation as part of the encoding process and as such can determine whether the camera is moving. A state of motion can also be determined and used to enable the gyroscope 110 when the camera 102 is moved. When the device 100 operates in the state of no motion, the motion sensor 110 may be polled at a slow interval to determine whether the device 100 has started moving again. There may be computationally cheaper ways to determine when the device 100 starts moving, depending on hardware and Application Programming Interfaces (APIs) implemented in the operating system of the device 100.

The timings of the operation of the hardware used for the camera 102 and for the gyroscope 110 might not match. This may be because the camera 102 and the gyroscope 110 are implemented in independent hardware chips. Therefore it may be beneficial to add an offset to the time stamps of either (or both) the samples generated by the gyroscope 110 and the frames of the video signal. In this way the timing of the samples from the gyroscope 110 can be matched with the timing of the frames of the video signal correctly. The offset may be constant for a particular combination of hardware chips. Therefore a delay may be computed offline and used at the device 100 without incurring a processing penalty for the method described herein.

Referring back to FIG. 3, in step S308 a pixel displacement representing the motion of the camera 102 is determined. In general, a rotation of the camera 102 results in an approximately constant pixel displacement across the image of a frame of the video signal, independent of distances to objects in the image. This is in contrast to linear camera motion, for which pixel displacement is a function of the distance to the object. A function (or algorithm) mapping the rotation of the device 100 to a pixel displacement depends on parameters of the camera 102 (e.g. focal length and width of lens of the camera 102) and the resolution of the images captured by the camera 102. Encoder feedback can be useful to determine the accuracy of the samples generated by the gyroscope 110 and to adapt the mapping algorithm. There are also some cases of motion and object placement where the stabilization model described herein based on the samples from the gyroscope 110 is not accurate (e.g. for rotation of the camera 102 around a user's face, the user's face may be stable in the middle of the frame but the gyroscope 110 detects rotation and therefore the stabilization process will attempt to stabilize the background) which may be detected by the encoder and fed back to the stabilization algorithm In this way the stabilization algorithm can be adapted.

The pixel displacement determined in step S308 represents the magnitude of the motion in the images of the frames of the video signal resulting from the motion of the camera 102 (as opposed to motion in the subject matter of the images). In this way, the pixel displacement determined in step S308 represents unwanted high frequency motion (shaking) in the images of the frames of the video signal.

Referring back to FIG. 2, following the monitoring step S202, the magnitude of the motion in the images of the frames of the video signal resulting from the motion of the camera 102 is compared to a predetermined threshold at step S204 to determine if the device 100 is shaking.

If it is determined at step S204 that the device 100 is not shaking, the process proceeds back to the monitoring step S202 whereby no cropping of the video signal is implemented such that the video signal maintains maximum output video resolution. A timer implemented at the device 100 (not shown in FIG. 1b) is reset upon this determination.

If it is determined at step S204 that the device 100 is shaking, the process proceeds to step S206. In step S206 a determination is made as to whether a period of time has elapsed since the timer was last reset.

If the period of time has not elapsed, then the process proceeds back to monitoring step S202. If the period of time has elapsed, the process proceeds to a stabilization step S208.

Figure 6:
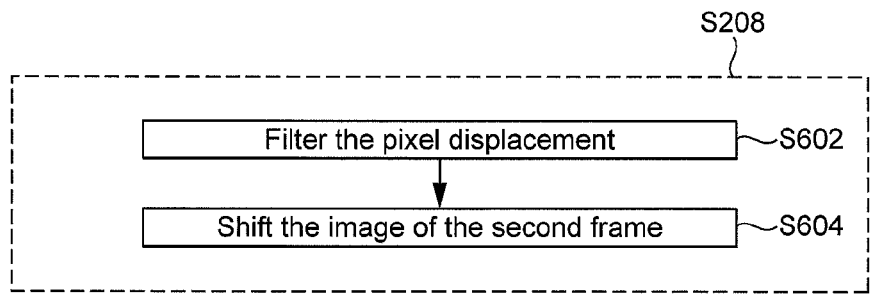
FIG. 6 is a flow chart for a stabilization process according to a preferred embodiment.

The stabilization step S208 will be described in more detail with reference to FIG. 6.

In step S602 the pixel displacement determined in step S308 is filtered. This is done in order to smooth the changes that are applied to the video signal in the image stabilization process over time to thereby provide a smoother stabilized video signal. The filter used to filter the pixel displacement can be designed in different ways, depending on, for example, the resolution of the images captured by the camera 102, the acceptable delay which may be applied to the video signal, and the allowed amount of cropping which can be applied to the images of the original video signal received at the pre-processor from the camera 102. For example, higher resolution video frames may benefit from a larger filter attenuation of high frequency changes to the pixel displacement applied in the image stabilization process. On the other hand, the amount of cropping sets a hard limit to the maximum filter attenuation.

An exponential filter may be used which filters the pixel displacements according to the equation:

$$x\_\text{filt}(n)=(1-w)*x\_\text{filt}(n-1)+w*x(n),$$

where n represents the frame number of the video signal, x represents the accumulated displacement (or "position"), according to the pixel displacement determined in step S308, and x_filt represents the filtered accumulated displacement which is subsequently used to determine how to align the input image in order to stabilize it as described in more detail below. In this way the filter acts as an exponential filter. When motion stops, x_filt-x will converge to zero which implies no shifting of the image. The filter smoothes out changes to the determined pixel displacement over time, by basing the filtered pixel displacements on the corresponding filtered pixel displacement of the previous frame as well as on the pixel displacement determined for the current frame in step S308. The weighting applied to the filtered pixel displacement of the previous frame is (1-w) whereas the weighting applied to the pixel displacement determined for the current frame is w. Therefore adjusting the weighting parameter, w, will adjust how responsive the filter is to changes in the pixel displacement (x). A recursive (Infinite Impulse Response (IIR)) filter is more suited than a Finite Impulse Response (FIR) filter when the output x_filt is clipped to be in the range [x−crop, x+crop] as the clipped value is fed back to the filter loop and makes subsequent output of x_filt less prone to clipping.

The weighting parameter, w, is adapted to the resolution and instant frame rate of the video signal to obtain a constant physical cut-off frequency, which is measured in Hertz. If the filter were an ideal filter then the physical cut-off frequency would define the highest frequency component of changes to x which will be incorporated into x_filt. Changes to x which have higher frequency than the cut-off frequency will be attenuated by an ideal filter and will not be present in x_filt. However, the filter is not an ideal filter and as such the cut-off frequency defines the highest frequency for which the attenuation applied by the filter is below 3 dB. So for non-ideal filters there will be some attenuation below the cut-off frequency and there will not be perfect attenuation above the cut-off frequency. The filter output is clipped so that that the difference between x_filt and x is not larger than the frame cropping size. w is adapted so that the physical cut-off frequency is constant, e.g. 0.5 Hz. From the filter transfer function, a function w(fc, fs) can be derived that maps a physical cut-off frequency fc to w. When the sampling frequency (frame rate) fs changes, w also changes even though fc is constant. The filter according to the filter equation above is well suited for instant changing of the cut-off frequency (changing w), compared to other filters.

In step S604 the image of the second frame (frame 2) is shifted using the filtered pixel displacement from step S602. In this way the motion in the image of the second frame (relative to the first frame) due to the motion of the camera 102 is attenuated. In other words, the filtered pixel displacement is used to compensate for the motion in the video signal between the first and second frames caused by the motion of the camera, to thereby stabilize the video signal.

The filtered pixel displacements are rounded to full-pixel displacements (i.e. integer-pixel displacements). This allows a simple method to be employed to shift the image of the second frame. The image is represented using a stride value indicating memory space of the image, a plurality of pixel values, a pointer indicating the position of a first pixel of the image, and a width value indicating the width of the image. The shifting of the image comprises adjusting the pointer and the width value without adjusting the stride value. It can be seen that the width value is independent of the stride value which allows the width of the image to be changed without affecting the stride of the image. Therefore the memory space of the image (e.g. in the memory 108) does not need to be changed when the image is shifted (and/or resized). This means that no copying of data in the memory 108 is necessary with this approach. This is in contrast to a conventional method of cropping an image in which the crop area of the image is copied into a new memory area. Copying the crop area may be computationally complex which may be detrimental, particularly when the method is to be implemented on a mobile device in which the processing resources available to the CPU 106 may be limited. With the method described herein, since the width value is independent of the stride value the new, shifted image can be created by changing the pointer and the width while the stride is kept intact.

The image may be represented by multiple image planes, for example a luma plane (Y) and two chroma planes (U and V). The image planes of the input image may be shifted and resized by simply changing the pointers to the luma and chroma planes, thereby modifying the width of the image planes whilst keeping the stride intact. The image planes are shifted by the same amount to ensure that the shifted image planes can be used together to represent the shifted image.

In order for this image shifting process to be implemented, the image planes require respective pointers, i.e. they cannot all be represented by the same, single pointer. Furthermore, as described above, it is necessary that the image has independent width and stride values.

Figure 7:
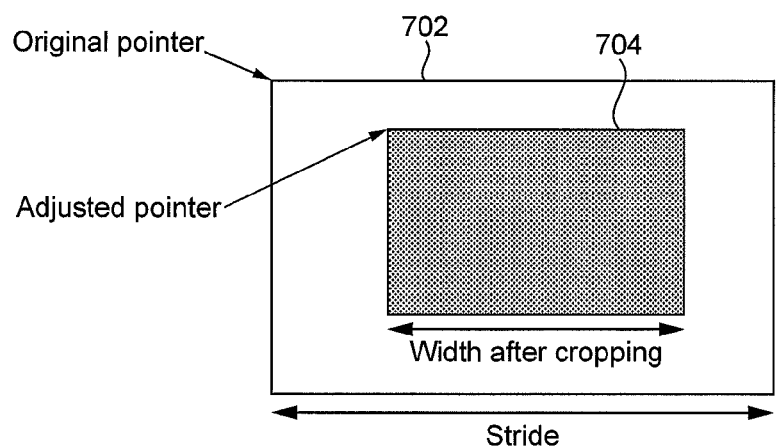
FIG. 7 is a representation of an image before and after a cropping process.

FIG. 7 is a representation of an image before and after a shifting and cropping process. The original image is denoted 702 and the shifted and cropped image is denoted 704. It can be seen that the stride value of the image is left unchanged, whereas the width of the image is reduced. Furthermore, the original pointer points to the top left pixel of the original image whereas the adjusted pointer points to the top left pixel of the shifted and cropped image (which is in a different position to the top left pixel of the original image). In this way the image is shifted and cropped simply be changing the width value and the pointer.

In summary of the method described above, the following stages are implemented in the pre-processor to stabilize the images of the frames of the video signal before the video signal is encoded with a video encoder:

1. the angular displacement of the camera 102 between frame 1 and frame 2 is estimated (step S306);
2. the estimated angular displacement is mapped to a pixel displacement of the image of frame 2 (step S308);
3. unintended motion in the image of frame 2 is removed by applying a filter to the sequence of pixel displacements (or to the accumulated pixel displacements as described above) (step S602); and
4. a stabilized image for frame 2 is created by shifting the image to the position calculated by the filter (step S604). The frame dimensions of the stabilized image for frame 2 are equal or less than the corresponding dimensions of the original image for frame 2. In other words, the stabilized images of the video signal are constructed by cutting out a moving border within the original images of the video signal captured by the camera 102.

Referring back to FIG. 2, following the stabilization step S208, the process proceeds to step S210.

In step S210, consideration is given to the next frame captured at step S302 to determine if the device 100 is still shaking. That is, the angular displacement of the camera 102 between two frames (frame 2 and 3) is determined and mapped to a pixel displacement representing the motion in the images of the frames of the video signal resulting from the motion of the camera 102. This has been described in detail hereinabove with reference to steps S306 and S308.

At step S210, the filtered magnitude of the motion in the images of the frames of the video signal resulting from the motion of the camera 102 is compared to a predetermined threshold to determine if the device 100 is still shaking If it is determined at step S210 that the device 100 is still shaking, the process proceeds to back to step S208. In step S208 unintended motion in the image of frame 3 is removed by applying a filter to the sequence of pixel displacements (or to the accumulated pixel displacements as described above) and a stabilized image for frame 3 is created by shifting the image to the position calculated by the filter, this has been described in detail hereinabove. A timer implemented at the device 100 (not shown in FIG. 1b) is reset upon this operation.

If it is determined at step S210 that the device 100 is not shaking, the process proceeds to step S212 where a determination is made as to whether a period of time has elapsed since the timer was last reset.

If it is determined at step S212 that the period of time has not elapsed, then the process proceeds back to stabilization step S208 where a stabilized image for frame 3 is created by shifting the image to the position calculated by the filter.

If it is determined at step S212 that the period of time has elapsed, the process proceeds back to monitoring step S208 whereby no cropping of frame 3 is implemented.

It will be appreciated that using a timeout value (defining the period of time referred to above) at steps S206 and S210 improves the continuity of the transmitted video signal.

The predetermined threshold used at step S204 for turning on stabilization is calculated by comparing the change in acceleration to a threshold (after filtering). The predetermined threshold used at step S210 for turning off stabilization is calculated by comparing the pixel motion vectors to a threshold of one pixel in each direction.

It will be appreciated that the thresholds and timeouts described hereinabove can be implementation specific, depending on sensor data accuracy and the complexity of required resolution changes.

It will be appreciated that the process described hereinabove will continually loop to consider whether each of the frames captured by the camera 102 require stabilization. Using the process described hereinabove with reference to FIG. 2 ensures stabilization is enabled only when required i.e. cropping the video signal only when necessary, thus maintaining maximum resolution of the video signal.

In the embodiments described above, the motion sensor 110 is a gyroscope which generates samples representing the rotational motion of the device 100. In other embodiments, the motion sensor 110 may sense other types of motion, such as translational motion and generate samples representing the translational motion of the device 100. These samples can be used in the same way as described above in relation to the rotational motion to stabilize the video signal. However, as described above, with translational motion the pixel displacement will depend on the distance to the object in the image and so this must be taken into account when determining the pixel displacements. For example, multiple accelerometers may be able to estimate rotational motion, and in this case accelerometers can be used without further modification. For more general translational stabilization, it may become more difficult to implement the method described herein since different areas in the image move by different amounts of pixels. However, if the distance to the object is constant (and known) it may be simple to implement the method with translation motion. Even where the distance to the objects is not constant (but is still known) it would be possible to implement the method with translation motion but extra complication is added in determining the pixel displacements caused by the translation motion of the camera 102.

After stabilizing the video signal the video signal is encoded using a video encoding process. The encoded video signal may be transmitted, e.g. as part of a video call to another user or as a broadcast signal. Therefore, it is important for the video signal to be able to be stabilized and encoded in real-time (i.e. with very little delay) for use in events such as video calls, or other communication events where users are perceptually very aware of delay in the signals. Alternatively, the encoded video signal could be stored at the device 100, e.g. in the memory 108.

The method steps S200-S212 could be implemented at the device 100 in software or in hardware. For example, the CPU 106 may execute processing blocks to implement the steps S200-S212. For example, a computer program product for stabilizing a video signal may be provided, which can be stored in the memory 108 and executed by the CPU 106. The computer program product may be configured so as when executed on the CPU 106 to perform the method steps S200-S212. Alternatively, hardware blocks may be implemented in the device 100 to implement the steps S200-S212.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

Furthermore, while this invention has been particularly shown and described with reference to preferred embodiments, it will be understood to those skilled in the art that various changes in form and detail may be made without departing from the scope of the invention as defined by the appended claims.

What is claimed is:

1. A method of transmitting a video signal from a user device, the method comprising:
   capturing a plurality of frames of the video signal using a camera at the user device;
   using a motion sensor associated with the camera to generate a plurality of samples representing motion of the camera;
   using the samples to determine a displacement of the camera between successive frames captured by the camera;
   determining a pixel displacement representing motion in the video signal between the successive frames caused by the determined displacement of the camera;
   comparing the pixel displacement to a threshold;
   stabilizing the video signal in real-time if the pixel displacement exceeds the threshold, the stabilizing the video signal comprising:
      filtering the pixel displacement by determining an accumulated pixel displacement based on said determined pixel displacement for a second frame of the successive frames, and determining a filtered accumulated pixel displacement for the second frame based on a weighted sum of the determined accumulated pixel displacement for the second frame and a filtered accumulated pixel displacement for a first frame of the successive frames; and
      shifting an image of at least one of the first frame and the second frame of the successive frames in accordance with the filtered pixel displacement.

2. The method of claim 1, wherein the motion of the camera is rotational motion, wherein the motion sensor is a rotational motion sensor, and wherein the displacement of the camera is an angular displacement of the camera.

3. The method of claim 1, wherein the user device comprises a front facing camera and a rear facing camera.

4. The method of claim 1, wherein a sample rate of the samples generated using the motion sensor is higher than a frame rate of the video signal.

5. The method of claim 1, wherein the user device comprises a mobile device, and wherein the camera and the motion sensor are situated within the mobile device.

6. The method of claim 1, further comprising adding a time offset to at least one of the captured plurality of frames and the generated plurality of samples, such that the timing of the captured plurality of frames matches the timing of the generated plurality of samples.

7. The method of claim 1, further comprising if the pixel displacement exceeds said threshold, using a timer to determine whether a predetermined period of time has elapsed and stabilizing the video signal only when said time period has elapsed.

8. The method of claim 7, further comprising resetting said timer if the pixel displacement does not exceed said threshold.

9. A device for stabilizing a video signal, the device comprising:
    a camera configured to capture a plurality of frames of the video signal;
    a motion sensor associated with the camera and configured to generate a plurality of samples representing motion of the camera;
    a pixel displacement determining block configured to use the samples to determine a pixel displacement of the camera between successive frames captured by the camera, the pixel displacement representing motion in the video signal between the successive frames caused by the motion of the camera;
    a comparison block configured to compare the pixel displacement to a threshold;
    a motion compensation block configured to stabilize the video signal by stabilizing the video signal if the pixel displacement exceeds the threshold, the stabilizing the video signal comprising:
        filtering the pixel displacement by determining an accumulated pixel displacement based on said determined pixel displacement for a second frame of the successive frames, and determining a filtered accumulated pixel displacement for the second frame based on a weighted sum of the determined accumulated pixel displacement for the second frame and a filtered accumulated pixel displacement for a first frame of the successive frames; and
        shifting an image of at least one of the first frame and the second frame of the successive frames in accordance with the filtered pixel displacement.

10. The device of claim 9, wherein the motion of the camera is rotational motion, wherein the motion sensor is a rotational motion sensor, and wherein the displacement of the camera is an angular displacement of the camera.

11. The device of claim 9, wherein the device comprises a front facing camera and a rear facing camera.

12. The device of claim 9, wherein the motion sensor is a gyroscopic motion sensor.

13. The device of claim 9, wherein the device is a mobile device.

14. A computer-readable storage device having code stored thereon that, responsive to execution by a processor of a device, performs a method comprising:
    capturing a plurality of frames of the video signal using a camera at the device;
    using a motion sensor associated with the camera to generate plurality of samples representing motion of the camera;
    using the samples to determine a displacement of the camera between successive frames captured by the camera;
    determining a pixel displacement representing motion in the video signal between the successive frames caused by the determined displacement of the camera;
    comparing the pixel displacement to a threshold;
    stabilizing the video signal in real-time if the pixel displacement exceeds the threshold, the stabilizing the video signal comprising:
        filtering the pixel displacement by determining an accumulated pixel displacement based on said determined pixel displacement for a second frame of the successive frames, and determining a filtered accumulated pixel displacement for the second frame based on a weighted sum of the determined accumulated pixel displacement for the second frame and a filtered accumulated pixel displacement for a first frame of the successive frames; and
    shifting an image of at least one of the first frame and the second frame of the successive frames in accordance with the filtered pixel displacement.

15. A method of transmitting a video signal from a user device, the method comprising:
    capturing a plurality of frames of the video signal using a camera at the user device;
    determining a functional state of the device, the functional state comprising a degree of motion of the camera;
    monitoring the motion of the camera by:
        using a motion sensor associated with the camera to generate a plurality of samples representing motion of the camera;
        using the samples to determine a displacement of the camera between successive frames captured by the camera; and
        determining a pixel displacement representing motion in the video signal between the successive frames caused by the determined displacement of the camera, the successive frames comprising a first frame and a second frame;
    comparing the pixel displacement to a threshold;
    stabilizing the video signal prior to transmission if the pixel displacement exceeds said threshold, the stabilizing comprising:
        filtering the pixel displacement by:
            determining an accumulated pixel displacement based on said determined pixel displacement for the successive frames; and
            determining a filtered accumulated pixel displacement for the second frame based on a weighted sum of the determined accumulated pixel displacement for the second frame and a filtered accumulated pixel displacement for the first frame; and
        shifting an image of at least one of the first frame and the second frame of the successive frames in accordance with the filtered pixel displacement; and
    transmitting the video signal without stabilization otherwise.

* * * * *